Dec. 7, 1954     H. C. RHODES     2,696,334
DOUGH PANNING MACHINE

Filed Dec. 15, 1952     3 Sheets-Sheet 1

INVENTOR.
HERBERT C. RHODES
BY *Otto Moeller*
ATTORNEY

Dec. 7, 1954
H. C. RHODES
2,696,334
DOUGH PANNING MACHINE
Filed Dec. 15, 1952
3 Sheets-Sheet 2
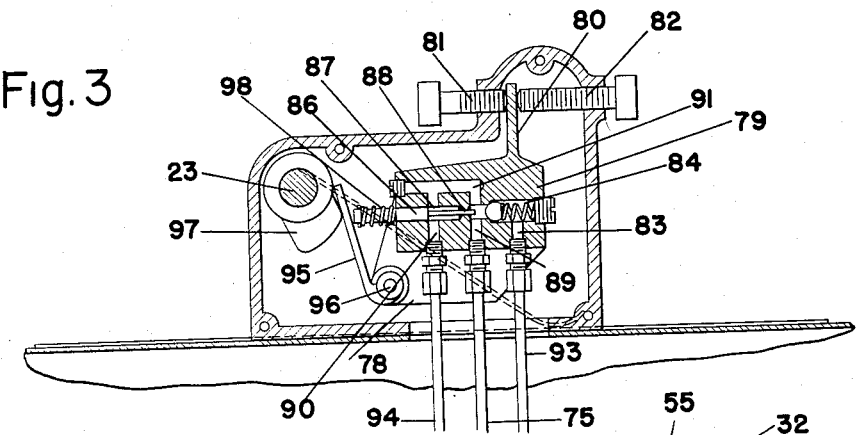
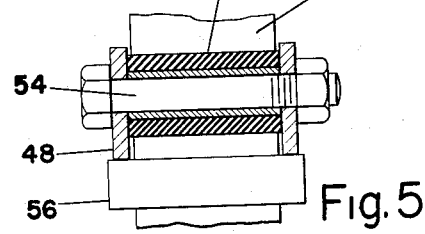
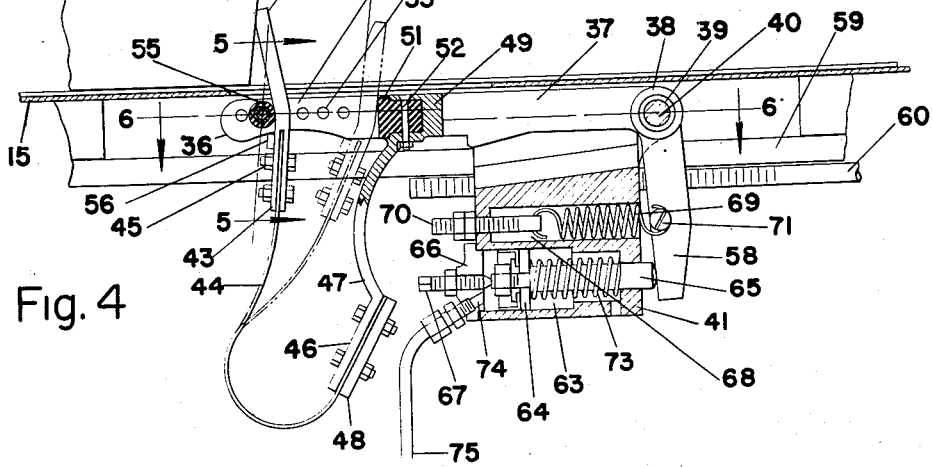
INVENTOR.
HERBERT C. RHODES
BY
Otto Moeller
ATTORNEY Dec. 7, 1954    H. C. RHODES    2,696,334
DOUGH PANNING MACHINE
Filed Dec. 15, 1952    3 Sheets-Sheet 3
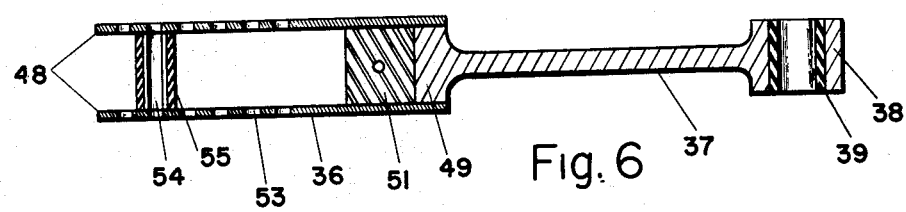
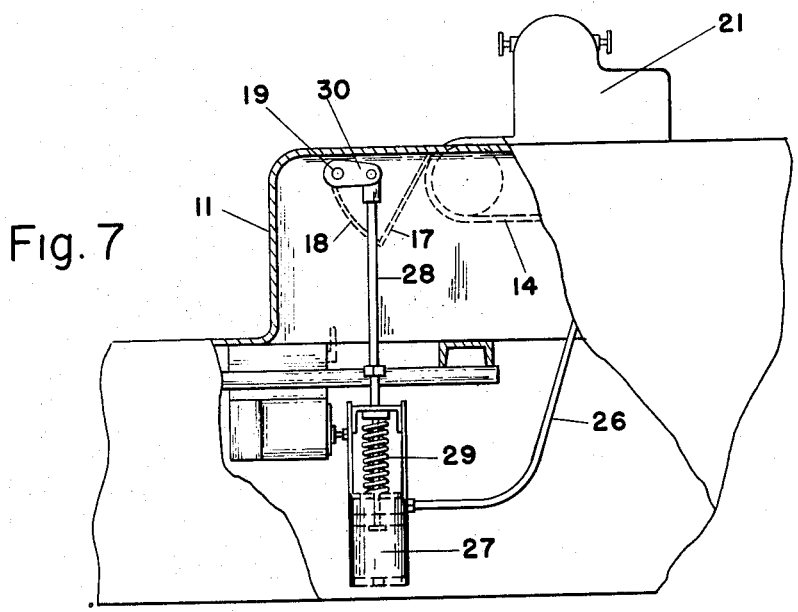
INVENTOR.
HERBERT C. RHODES
BY
*Otto Moeller*
ATTORNEY

United States Patent Office 2,696,334
Patented Dec. 7, 1954

2,696,334

DOUGH PANNING MACHINE

Herbert Cecil Rhodes, Portland, Oreg., assignor to Read Standard Corporation, a corporation of Delaware Application December 15, 1952, Serial No. 326,117

9 Claims. (Cl. 226—2)

The present invention relates broadly to an automatic dough panning machine and more specifically to mechanism for engaging and stopping the dough pans.

In bakeries employing machines for performing the various and sundry operations pertaining to the mixing and handling of dough, such as bread dough, it is customary to deliver spaced masses of dough to a moulder panner machine after which the dough is delivered in pans to the baking ovens. In a moulder panner machine the spaced masses of dough pass through a series of sheeting rollers to form the dough into an elongated sheet after which the dough sheet is rolled or curled up and then deposited into a pan. The dough receiving pans are usually moved through a moulder panner machine by a traveling belt or conveyor while the curled dough pieces are carried by an endless conveyor positioned above and parallel to the pan belt, but terminating short of the pan belt so that the pieces of dough can drop off of the end of the upper belt into the pans on the lower belt.

In order to stop the travel of the dough pans beneath the end of the dough conveying belt, so that a piece of dough can drop into a pan, it is customary to employ a pair of retractable pan stop members or elements positioned on opposite sides of the pan conveying belt. The pan stop members or fingers employed heretofore in moulder panner machines have not been entirely satisfactory in that they created a severe stopping action, producing considerable noise, while at the same time tending to form dents in the lower leading edge of the pans. Furthermore said pan stopping fingers due to their mode of operation and rigid structure were prone to skip pans when the moulder panner machine was operated at a high rate of speed, such as 100 pieces of dough per minute.

The pan stopping mechanism of the present invention is designed to overcome the defects of prior machines. In addition the pan stopping mechanism of the present invention is designed for use with aluminum dough pans and is capable of controlling said pans without damaging same.

One of the objects of the present invention is to provide a pan stopping mechanism having a spring controlled finger member for engaging and stopping the dough pans with a cushioning action.

Another object is to provide a pan stopping mechanism including a pan engaging finger element that is adapted to be moved into engagement with a resilient bumper for cushioning the stopping action of the pans.

Another object is to provide a pan stopping mechanism having a pan engaging finger element that is spring actuated for rapidly moving the finger element out of engagement with one pan and into engagement with the next succeeding pan.

A further object is to provide a dough pan engaging finger element carried by a spring member for engaging the succeeding pans of a strap of pans to produce a slight shaking action for settling the dough pieces in said pans.

Still further objects are to provide a pan stopping mechanism which is adapted for use with aluminum dough pans, capable of being used on moulder panner machines in present day usage and is economical of manufacture.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the preferred embodiment of the invention is illustrated:

Figure 3 is a sectional elevational view showing the details of the air valve assembly for controlling the pan stopping mechanism, the view being taken on a plane indicated by line 3—3 of Figure 2;

Figure 4 is a fragmentary sectional elevational view on an enlarged scale showing the pan stopping mechanism, the view being taken on a plane indicated by line 4—4 of Figure 2;

Figure 5 is a fragmentary sectional view of a portion of the pan stopping mechanism, the view being taken on a plane indicated by line 5—5 of Figure 4;

Figure 6 is a horizontal sectional view of a portion of the pan stopping mechanism, the view being taken on a plane indicated by the line 6—6 of Figure 4; and, Figure 7 is a fragmentary side elevational view of the moulder panner machine with a portion of the casing being broken away and showing a portion of the control assembly of the dough delivering mechanism.

Figure 1:
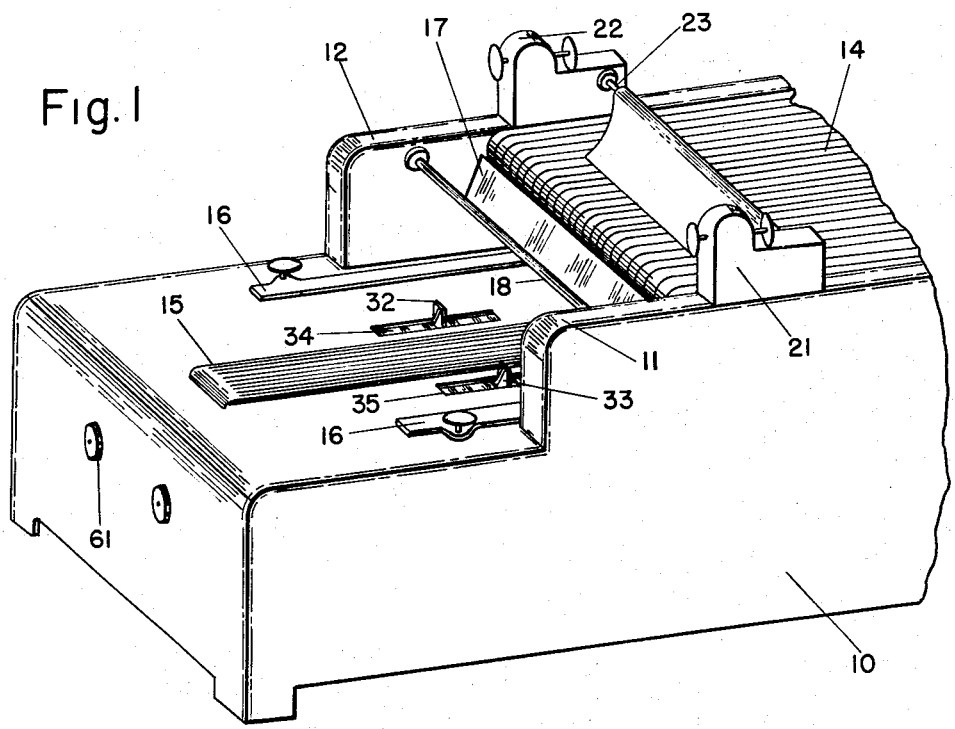
Figure 1 is a perspective view of the dough delivering end portion of a moulder panner machine showing the pan stopping finger elements therein.

Referring to Figure 1 there is shown the delivery end portion of a moulder panner machine 10 having hollow side wall housings 11 and 12 located at opposite sides in the upper portion of the machine but terminating short of the end of the machine. An endless conveyor belt 14 entrained over an end roller, not shown, is adapted to receive and carry from the dough curling mechanism, not shown, separate pieces of dough for delivery to the baking pans P, Figure 2. The baking pans P, which are customarily arranged in sets or straps, are carried through the moulder panner machine on an endless conveyor belt 15 disposed beneath the dough conveyor belt 14.

The baking pans P are maintained in proper position on the conveyor belt 15 by a pair of guide rails 16 which are adjustably mounted in spaced parallel relation with the belt 15 to accommodate pans of different lengths. The arrangement of having one of the conveyor belts positioned above and parallel to the other belt with the uppermost belt terminating short of the lower or pan belt so that pieces of dough can drop off of the end of the upper belt and into the pans on the lower belt is well known in the art and common to machines of this general type.

In the moulder panner machine 10, Figure 1, the conveyor belt 14 delivers pieces of dough into a trough type dispenser positioned slightly beyond and below the end of the belt 14. The pieces of dough are then delivered from the dispenser to the pans carried by the conveyor belt 15. The trough type dispenser is composed of a stationary plate 17, Figures 1 and 7, supported between the opposite inner walls of the side housings 11 and 12 and a cooperating hinged plate 18 secured to a shaft 19. The ends of the shaft 19 are rotatably supported in the housings 11 and 12.

Figure 2:
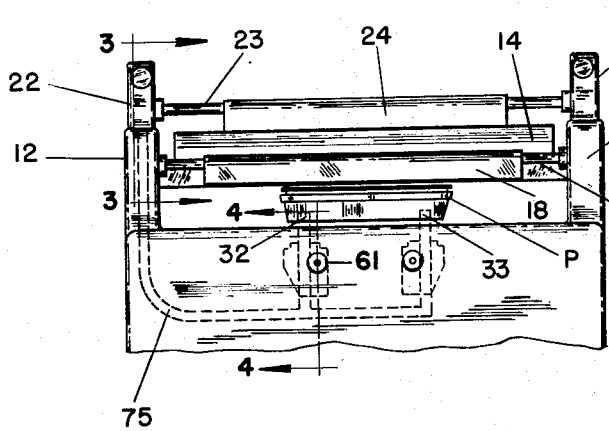
Figure 2 is an end elevational view of the machine shown in Figure 1 with the pan stopping means being indicated by broken lines.

The trough type dispenser is the same as that disclosed in my prior Patent 2,590,823 of March 25, 1952, and in as much as it does not constitute a part of the present invention, a detailed description is not deemed necessary. As shown in Figures 1 and 2 a pair of identical housings 21 and 22 are disposed above the side wall housings 11 and 12, respectively, in transverse alignment with each other. An identical air valve control assembly is located in each of the housings 21 and 22, one of which controls the actuation of the trough type dispenser and the other controlling the actuation of the pan stopping mechanism. A shaft 23, with its ends rotatably supported in the housings 21 and 22, has a dough engageable trip plate 24 rigidly secured thereto and arranged to extend over the conveyor belt 14 to be lifted by a piece of dough carried thereby.

The trough type dispenser is actuated by a piece of dough on the conveyor 14 engaging and lifting momentarily the trip plate 24 which causes shaft 23 to be rotated. The movement of shaft 23 actuates an air valve assembly, not shown, in the housing 21, Figure 7, which causes compressed air to pass through tube 26 to the cylinder 27. The delivery of compressed air to cylinder 27 moves a piston and piston rod 28 downwardly against the force of a spring 29. The upper or free end of the piston rod is connected to an arm 30 that is secured to an end of the shaft 19 on which is secured plate 18 of the trough type dispenser. Thus the downward movement of piston rod 28 rotates shaft 19 through the arm 30 and thereby swinging the hinged plate 18 of the dispenser momentarily into an open position. This movement of the plate 18 permits a piece of dough, previously delivered to the trough type dispenser by the belt 14, to drop from the dispenser into a pan positioned therebeneath on the conveyor belt 15. Thus each succeeding piece of dough raises the trip plate 24 and thereby actuates the dispenser to drop the previous piece of dough into a pan. As each piece of dough is carried beneath and beyond the trip plate 24 by the belt 14 the trip plate drops back to its normal or inoperative position thus actuating the air valve assembly in housing 21 to cut off the supply of compressed air to the cylinder 27. The shutting off of the air to cylinder 27 allows spring 29 to raise the piston rod 28 and thus move plate 18 to its closed or inoperative position for receiving a piece of dough in the trough type dispenser.

The pans carried by the conveyor belt 15 for receiving the pieces of dough from the trough type dispenser have to be stopped and held momentarily in the proper position beneath the dispenser. As shown in Figures 1 and 2 a pair of pan engaging finger elements or members 32 and 33 extend through slots 34 and 35, respectively, located on opposite sides of the belt 15. The pan engaging members 32 and 33 project slightly above the belt 15 in order to engage the leading side of the dough pans P. In as much as the pan engaging fingers 32 and 33 are identical and operate in the same manner a detailed description and the manner in which it is actuated will be given with respect to member 32.

The pan engaging finger 32 extends through a bifurcated or yoked end portion 36 of an arm or lever 37, Figures 4 and 6. The other end of the lever 37 is provided with a boss 38 having a bushing 39 for pivotally mounting the lever on a horizontally disposed stub shaft 40 which is supported in a pair of bracket lugs, not shown, at the upper forward end of a carriage block 41, Figure 4. The bottom or lower end portion 43 of the finger 32 is slotted to receive one end of a spring member 44 which is secured to the finger by suitable bolts and nuts 45. The spring member 44 is bent into an arcuate or looped configuration towards the forward end of the moulder pan machine 10 and has its other end secured to the outer end 46 of an arm or bracket 47 by a clamping plate 48. The bracket 47 may be formed as an integral part of the lever 37 or it may be a separate part secured to the lever by any suitable means, such as welding, adjacent the point where the bifurcated portion 36 joins the lever 37, Figure 4. The bracket 47 projects downwardly from the lever 37 and is of an arcuate configuration terminating in the angularly offset end portion 46.

The bifurcated end portion 36 of the lever 37, Figure 6, consists of a pair of spaced parallel plate members 48 which are secured to the enlarged end 49 of the lever 37 by any suitable means, such as welding. The plate members 48 and enlarged end portion 49 of the lever 37 define a socket for a resilient bumper member 51 which is anchored therein by a rivet or pin 52, Figure 6. The plate members 48 are formed with a plurality of spaced aligned apertures 53 for retaining between the plate members 48 a pin 54 having a resilient sleeve 55 thereon. The pin 54 and resilient sleeve 55 constitute a bumper or limit stop member for the pan engaging finger 32 and the position of the pin in the plate members 48 determines the degree of movement of the finger 32. The lower or bottom edge of the plate members 48 are formed with a slight concave surface which constitutes a track upon which rides a boss or lug 56, Figures 4 and 5, that is secured to the finger 32 by any suitable means, such as welding. The boss 56 not only guides the finger 32 in its path of movement between the plate members 48 but also prevents the finger 32 from projecting through the slot 34 beside the belt 15 more than the prescribed distance for satisfactory operation of the pan stopping mechanism.

The end of the lever 37 which is pivotally mounted on the stub shaft 40, Figure 4, has formed integrally therewith a downwardly extending arm 58 which is disposed adjacent the forward end of the carriage block 41. The carriage block 41 is slidably supported on a pair of parallel stationary horizontal rods 59, one of which is shown in Figure 4. A threaded shaft 60 extends through a correspondingly threaded channel in the carriage block 41 and the forward or outer end of shaft 54 projects beyond the end of the moulder panner machine housing and has mounted thereon a hand knob 61, Figures 1 and 2. The rotative manipulation of the hand knob 61 moves the carriage block 41 in either direction on the rods 59, when viewing Figure 4, and the movement of the carriage block causes the pan engaging finger 32 to be moved in a complementary direction in the slot 34 parallel to the belt 15.

The carriage block 41 has formed in the bottom portion thereof a horizontal cylindrical air chamber 63 within which is a piston 64 mounted on one end of a piston rod 65. The free end of the piston rod 65 extends through an aperture in the forward wall of the chamber 63 and engages the lower end of the arm 58 of the lever 37. The other end of the chamber 63 is closed by a plug 66 which has projecting therethrough an adjustably threaded stop member 67 for limiting the movement of the piston 64 in one direction. The block 41 has a recess or chamber 68 formed therein, superjacent the chamber 63, for receiving a light coil spring 69 one end of which is secured to an adjustable threaded stud 70 that extends into the recess 68. The other end of the spring 69 extends out of the recess 68 and is secured to the arm 58 of the lever 37 by a set screw 71 for returning the arm 58 to its normal or inoperative position. A coil spring 73 encircles the piston rod 65 between the piston 64 and the end of chamber 63 for urging the piston into engagement with the stop member 67. The plug 66 in the chamber 63 is formed with an air port 74 to which is connected a flexible air conduit 75 that extends from the air control valve assembly mounted in housing 22.

Thus the passage of air under pressure through conduit 75 and into chamber 63 moves the piston 64 and piston rod 65 towards the right, as viewed in Figure 4, thereby moving arm 58 away from the block 41. The movement of arm 58 causes lever 37 and bracket 47 to pivot about stub shaft 40 thus moving finger 32 downwardly through the slot 34 and out of engagement with the dough pans on the belt 15. Upon the actuation of the air control valve assembly in housing 22 to cut off the supply of air in conduit 75, the pressure of the air is materially reduced in chamber 63 so that spring 73 moves the piston 64 into engagement with the stop member 67. At the same time that spring 73 moves piston 64 against the stop 67 the spring 69 in recess 68 returns the arm 58 to its normal position which movement causes lever 37 and bracket 47 to be returned to their normal positions and also raises finger 32 to its normal position.

The air valve assembly for controlling the movement of the pan engaging element 32 is located within the housing 22, Figure 3, and includes a vertically disposed mounting plate 78 which carries a block 79. The plate 78 and block 79 are pivotally mounted on a pin, not shown, and the block 79 is provided with an upwardly projecting arm 80. The upper end portion of the arm 80 is engaged on diametrically opposite sides by a pair of adjusting screws 81 and 82 for moving the plate 78 and block 79 upwardly or downwardly through a slight arcuate path about the pin on which the plate 78 is mounted. The block 79 is bored to provide an inlet channel 83 which terminates in a valve chamber 84 wherein a conventional ball valve and spring are retained by a threaded plug, as illustrated in Fig. 3.

A piston 86 slidably mounted in a chamber 87, formed in the block 79, is provided on one end with a piston rod 88 which engages the ball valve while the other end of the piston extends beyond the block 79. An intermediate channel 89 and an outlet or exhaust channel 90 are formed in the block 79 in spaced parallel relation with the inlet channel 83 and with one another. The intermediate channel 89 which crosses the chamber 87 and is thereby connected to the valve chamber 84 terminates in one end of a transverse passage 91. The outlet channel 90 also crosses the chamber 87 and terminates in the other end of the passage 91. The inlet channel 83 is connected to a suitable source of compressed air, not shown, by a flexible conduit 93 which channel 89 is connected to the chamber 63, Figure 4, by conduit 75. The outlet channel 90 is provided with a flexible conduit 94 for delivering the compressed air to the atmosphere on the exhaust cycle of the control valve assembly. An arm 95 has one end pivotally mounted on the plate 78 by a pin 96 while the other end engages a cam member 97 that is secured to an end of the shaft 23 on which the trip plate 24 is mounted. The arm 95 also engages the end of the piston 86 which projects beyond the block 79 and a coil spring 98 mounted on this portion of the piston 86 aids in returning the piston to its normal or inoperative position.

In the operation of the pan stopping mechanism of the present invention the pan stopping finger elements 32 and 33 are adjusted by the hand knobs 61 until they are in transverse alignment with each other and both act in unison to allow intermittent movement of a set of pans, P, one pan at a time. The pieces of molded dough are carried in spaced relation with one another on the belt 14, so that with a piece of dough already deposited in the trough type dispenser 17—18 and the pans P engaging the finger members 32 and 33 and in the broken line position of Figure 4, the next succeeding piece of dough on the belt 14 will engage the trip plate 24 and raise same a sufficient distance for the piece of dough to pass therebeneath.

The raising of the trip plate 24 causes shaft 23 to be rotated which movement actuates the air control valve assembly in housing 21 whereby air is delivered through conduit 26 to the cylinder 27 causing piston rod 28 to be moved downwardly, Figure 7. The movement of piston rod 28 rotates arm 30 for actuating plate 18 to open the trough dispenser and the first piece of dough drops into the first pan P.

The rotation of shaft 23 causes cam 97, Figure 3, to be moved in a counterclockwise direction thereby moving arm 95 and in turn piston 86 and piston rod 88 in the block 79 for unseating the ball valve in chamber 84. The unseating of the ball valve in chamber 84 permits air under pressure to pass into the channel 89 and conduit 75 at the same time outlet channel 90 will be closed by the piston 86. The air under pressure in conduit 75 is delivered to chamber 63 in carriage block 41, Figure 4, for actuating piston 65 which causes arm 58 and lever 37 to be rotated about stub shaft 40 which movement pulls the pan engaging finger elements 32 and 33 down out of engagement with the pans P. The disengagement of the fingers 32 and 33 from the pans allows the pans P on the belt 15 to start moving with the belt which is moving at all times even when the pans are in engagement with the finger members 32 and 33.

As soon as the piece of dough on the conveyor belt 14 has moved beyond the trip plate 24 said trip plate, due to its weight, will move back to its normal or inoperative position in turn rotating shaft 23 and cam 97 in a clockwise direction. The rotation of cam 97 enables the spring 98 to move arm 95 outwardly from the block 97 whereby the spring actuated ball valve will force piston rod 88 and piston 86 to the left as viewed in Figure 3. The movement of piston 86 enables the ball valve in chamber 84 to cut off the supply of compressed air through channel 83. This movement of piston 86 also opens the outlet or exhaust channel 90 so that channel 89 is then in communication with the exhaust outlet 90 through passage 91 thereby permitting the air in chamber 63 to flow through conduit 75 and out through the exhaust outlet 90. The evacuation of air from chamber 63 enables spring 73 to move piston rod 65 to left, as viewed in Figure 4, thereby enabling spring 69 to move arm 58 and lever 37 to their normal position. With the arm 58, lever 37 and bracket 47 returned to their normal position the pan engaging finger elements 32 and 33 are now free to return to their raised position beside the conveyor belt 15.

When the pan engaging fingers 32 and 33 are in their retracted or lowered position the pans P will start moving under the frictional pull of the belt 15 but before a single pan has moved beyond the slots 34 and 35, Figure 1, the pan engaging members 32 and 33 are being urged upwardly by the bracket 47 and spring 44. The pan engaging fingers 32 and 33 in being urged upwardly by the spring 44 will engage the bottom surface of the same pan which was being held by the fingers beneath the trough type dispenser. The fingers in engaging the bottom surface of the pan will be held down by the weight of the dough laden pan and as the pan is moved by the belt 15 the fingers will ride along on the bottom surface of the pan. As the first pan moves beyond the fingers 32 and 33 the fingers will be raised by the spring 44 and also by the spring 69, acting as arm 58 and in turn lever 37 and bracket 47 so that the leading bottom edge of the second or next succeeding pan will be engaged by the fingers.

Upon engaging the leading edge of the second or next succeeding pan the fingers 32 and 33 will be moved through the bifurcated portion 36 of the lever 37 from the rubber covered pin 54 to the resilient bumper 51 due to the frictional pull of the belt 15 upon the pans. As the fingers move through the bifurcated portion 36 the boss 56 rides on the concave track on the lower edge of the bifurcated portion 36 to retain the fingers in correct path of movement. The movement of the fingers in the bifurcated portion 36 of the lever 37 is against the action of spring 44 which movement tends to compress spring 44 thereby resisting the continued movement of the pan and fingers and gradually retarding the movement of the pans. Thus as the fingers 32 and 33 approach the bumper 51 the movement of the pans has been so retarded that when the fingers engage the bumper the pans are brought to a stop with a gentle cushioning action. The gentle cushioning action of the fingers through the action of spring 44 tends to eliminate any sudden stoppage of the pans thereby adding to the life of the pans. It is due to the flexing or compressing of the spring 44 during the movement of the fingers 32 and 33 that the travel of the pans is gradually retarded, thereby enabling the pans to be stopped at the loading position in a gentle manner and with a cushioning action. Furthermore when the fingers 32 and 33 are lowered or retracted the spring 44 flexes to its normal position thereby rapidly moving the fingers through the bifurcated portion 36 and against the rubber covered pin 54 where the fingers will be in position for being raised or elevated.

As stated hereinabove when the next or succeeding piece of dough moves beyond the trip plate 24 the trip plate will return to its normal position thereby rotating shaft 23. This rotation of shaft 23 actuates the air control valve in housing 21 in the same manner as the air control valve in housing 22 thereby allowing hinged plate 18, Figure 7, of the trough dispenser to return to its normal or closed position for catching and retaining the piece of dough.

The foregoing description of the operation of the machine of the present invention has been predicated upon the depositing of only a single piece of dough in a pan. In the event that double loaves are to be baked then the fingers 32 and 33 are arranged in their respective slots 34 and 35 in a staggered relation with respect to one another. This arrangement is accomplished by turning the hand knobs 61.

I claim:

1. In an automatic dough pan loader having a dough dispenser with a movable member for dropping pieces of dough into consecutive pans moved into position beneath said dispenser the combination of a pan stopping mechanism comprising a pivotally mounted lever having a bifurcated portion, a spring connected to said lever, a finger member connected to said spring and projecting through said bifurcated portion for engaging said pans, said finger member being movable bodily from one end to the other of said bifurcated portion by said pans, said bifurcated portion being provided with stop means for limiting fore and aft movement of said finger member, one of said stop means being disposed to stop said pans beneath said dispenser, said spring flexing upon the engagement of said finger member with said pans for cushioning the stopping action of the pans and means for actuating said lever to effect movement of said finger member out of pan engaging position.

2. In a dough pan loader of the character described, a conveyor belt for delivering pieces of dough, a dough contacting trip plate extending over said conveyor belt and actuated by the movement of pieces of dough past said trip plate, a second conveyor belt located below said dough conveyor belt for moving dough pans, a pan stopping mechanism for stopping the movement of said dough pans comprising a carriage block, a lever having a bifurcated portion pivotally mounted on said block, a spring having one end connected to said lever, a finger member connected to the other end of said spring and extending through said bifurcated portion for engaging and stopping said dough pans, said spring being flexed upon the engagement of said finger member with said dough pans for resiliently stopping said dough pans as said finger member moves from one end to the other of said bifurcated portion, and means carried by said carriage block and operated by said trip plate for actuating said lever to move said finger member out of pan engaging position when said trip plate is engaged by a piece of dough.

3. In a dough pan loader of the character described, a conveyor belt for delivering pieces of dough, a dough contacting trip plate extending over said conveyor belt and actuated by the movement of pieces of dough past said trip plate, a second conveyor belt located below said dough conveyor belt for moving dough pans, a pan stopping mechanism for stopping the movement of said dough pans comprising a carriage block, a lever having a bifurcated portion pivotally mounted on said block, a resilient member mounted in one end of said bifurcated portion, a limit stop member adjustably positioned in the other end of said bifurcated portion, a spring having one end connected to said lever, a finger member connected to the other end of said spring and extending through said bifurcated portion intermediate said resilient member and limit stop member, said finger member engaging said pans and moving therewith from said limit stop member to said resilient member to compress said spring and gradually retard the movement of the pans, said finger member in its path of movement engaging said resilient member for cushioning the stopping of said pans, an air actuated piston in said carriage block for moving said lever and spring whereby said finger member is moved out of pan engaging position and means actuated by said trip plate for governing the operation of said piston.

4. A pan stopping mechanism for an automatic dough pan loader having a conveyor belt for carrying a plurality of dough pans comprising a pivotally mounted lever having a bifurcated portion, a finger extending through said bifurcated portion for engaging said pans and being movable bodily from one end to the other of said bifurcated portion by said pans, a spring connected to said finger and lever, said spring upon the movement of said finger being flexed to gradually retard the movement of said finger and pans and cushion the stopping of the pans when the finger engages one end of said bifurcated portion, and said bifurcated portion being provided with stop means for limiting fore and aft movement of said finger member.

5. A pan stopping mechanism for an automatic dough pan loader having a conveyor belt for carrying a plurality of dough pans comprising a pivotally mounted lever having a bifurcated portion, a finger extending through said bifurcated portion for engaging said pans and being moved from one end to the other of said bifurcated portion by said pans, a boss on said finger engageable with said bifurcated portion for guiding said finger in its path of movement, a bracket on said lever, a spring having its ends connected to said bracket and finger respectively for moving said finger towards one end of the bifurcated portion, said spring upon the movement of said finger towards the other end of the bifurcated portion being compressed to gradually retard the movement of said finger and pans and to cushion the stopping of the pans when the finger engages the last mentioned end of said bifurcated portion.

6. A pan stopping mechanism for an automatic dough pan loader having a conveyor belt for carrying a plurality of dough pans comprising a pivotally mounted lever having a bifurcated portion, a finger extending through said bifurcated portion for engaging said pans and being moved from one end to the other of said bifurcated portion by said pans, a boss on said finger engageable with said bifurcated portion for guiding said finger in its path of movement, a bracket on said lever, a spring having its ends connected to said bracket and finger respectively for moving said finger towards one end of the bifurcated portion, said spring upon the movement of said finger towards the other end of the bifurcated portion being compressed to gradually retard the movement of said finger and pans and to cushion the stopping of the pans when the finger engages the last mentioned end of said bifurcated portion and means for actuating said lever to move said finger out of pan engaging position whereby said spring will move said finger towards the first mentioned end of the bifurcated portion.

7. A pan stopping mechanism for an automatic dough pan loader having a conveyor belt for carrying a plurality of dough pans, comprising, a lever having a bifurcated portion, a resilient bumper member mounted in one end of the bifurcated portion, a finger member extending through said bifurcated portion for engaging said pans, said finger being moved towards said bumper member by said pans, a depending arcuate shaped bracket on said lever, a spring having its ends secured to said bracket and finger for normally retaining said finger out of engagement with said bumper, said spring upon the movement of said pans and finger towards said bumper member being compressed to gradually retard the movement of said finger and pans and to cushion the stopping of said pans when said finger engages said bumper member.

8. A pan stopping mechanism for an automatic dough pan loader having a conveyor belt for carrying a plurality of dough pans, comprising, a pivotally mounted lever having a bifurcated portion, a resilient bumper member mounted in one end of the bifurcated portion, a limit stop member adjustably mounted in the other end of the bifurcated portion, a finger member extending through said bifurcated portion for engaging said pans, said finger member being moved from the limit stop member to the bumper member by said pans, means on said finger engageable with said bifurcated portion for guiding said finger in its path of movement from the limit stop member to the bumper member, a depending arcuate shaped bracket on said lever, a spring having its ends secured to said bracket and finger for normally retaining said finger in engagement with the limit stop member, said spring upon the movement of said pans and finger towards said bumper member being compressed to gradually retard the movement of said finger and pans and to cushion the stopping of said pans when said finger engages said bumper member and means for moving said lever to withdraw said finger through said bifurcated portion and out of its pan engaging position whereby said spring will move said finger against said limit stop member to position said finger for engaging the next succeeding pan when said lever is returned to its normal position.

9. A pan stopping mechanism for an automatic dough pan loader having a conveyor belt for carrying a plurality of dough pans, comprising a pivotally mounted lever, a pair of plate members secured to an end of said lever in spaced parallel relation, a resilient bumper member mounted between said plate members at one end thereof, a limit stop member adjustably mounted in said plate members adjacent the other end thereof, a finger member extending between said plate members intermediate the bumper member and limit stop member for engaging said pans, said finger member being moved from the limit stop member to the bumper member by said pans, a boss on said finger member engageable with an arcuate shaped surface on said plate members for guiding said finger in its path of movement, a depending bracket on said lever, a spring having its ends secured to said bracket and finger member for normally retaining said finger member in engagement with the limit stop member, said spring upon the movement of said pans and finger member towards said bumper member being compressed to gradually retard the movement of said pans and finger member and to cushion the stopping of said pans upon the engagement of said finger member with said bumper member and means for moving said lever to withdraw said finger member through said plate members and out of its pan engaging position whereby said spring will move said finger member against said limit stop member to position said finger member for engaging the next succeeding pan when said lever is returned to its normal position.

References Cited in the file of this patent

UNITED STATES PATENTS

| Number | Name | Date |
|---|---|---|
| 1,393,581 | Sells | Oct. 11, 1921 |
| 2,590,823 | Rhodes | Mar. 25, 1952 |